(12) United States Patent
Westbrook, VI et al.

(10) Patent No.: US 11,608,813 B2
(45) Date of Patent: Mar. 21, 2023

(54) WIND MACHINE CONTROL AND MONITOR SYSTEMS AND METHODS

(71) Applicant: Westbrook Labs, Inc., Castro Valley, CA (US)

(72) Inventors: Henry Westbrook, VI, Castro Valley, CA (US); Neil Schultz, San Francisco, CA (US)

(73) Assignee: WESTBROOK LABS, INC., Castro Valley, CA (US)

( * ) Notice: Subject to any disclaimer, the term of this patent is extended or adjusted under 35 U.S.C. 154(b) by 185 days.

(21) Appl. No.: 17/208,011

(22) Filed: Mar. 22, 2021

(65) Prior Publication Data

US 2022/0299008 A1   Sep. 22, 2022

(51) Int. Cl.
*F03D 7/04* (2006.01)
*H02P 23/14* (2006.01)
*G08C 17/00* (2006.01)
*F03D 7/02* (2006.01)
*F03D 17/00* (2016.01)
*H02P 1/08* (2006.01)

(52) U.S. Cl.
CPC ............ *F03D 7/042* (2013.01); *F03D 7/026* (2013.01); *F03D 7/0264* (2013.01); *F03D 17/00* (2016.05); *G08C 17/00* (2013.01); *H02P 1/08* (2013.01); *H02P 23/14* (2013.01)

(58) Field of Classification Search
CPC ...... A01G 13/065; A43B 1/04; A43B 23/042; A43B 23/26; A43D 8/00; D04B 1/123; D10B 2403/032; D10B 2501/043; F03D 17/00; F03D 7/026; F03D 7/0264; F03D 7/042; G08C 17/00; Y02E 10/72; H02P 1/08; H02P 23/14
See application file for complete search history.

(56) References Cited

U.S. PATENT DOCUMENTS

| | | |
|---|---|---|
| 2,712,714 A | 7/1955 | Mcgee |
| 3,067,541 A | 12/1962 | Smith |
| 3,230,667 A | 1/1966 | Sinner |
| 3,296,739 A | 1/1967 | Wiegel |
| 3,377,743 A | 4/1968 | Thompson et al. |
| 4,015,366 A | 4/1977 | Hall, III |
| 4,513,529 A | 4/1985 | Reich |
| 5,082,177 A | 1/1992 | Hill et al. |
| 6,182,652 B1 | 2/2001 | Hill |
| 6,237,859 B1 | 5/2001 | Hill |
| 7,047,803 B1 | 5/2006 | Hill |
| 7,050,887 B2 | 5/2006 | Alvarez |
| 7,245,991 B1 | 7/2007 | Woytowitz |
| 8,083,481 B2 | 12/2011 | Hill |
| 8,326,440 B2 | 12/2012 | Christfort |

(Continued)

FOREIGN PATENT DOCUMENTS

| | | |
|---|---|---|
| FR | 2486358 A1 | 1/1982 |
| FR | 2577379 B1 | 10/1988 |

(Continued)

*Primary Examiner* — Omer S Khan
(74) *Attorney, Agent, or Firm* — Wagenknecht IP Law Group PC (57) ABSTRACT

Systems and methods for controlling and monitoring agricultural equipment. The system includes a monitoring module that communicates with a remote user device to remotely turn a wind machine on or off.

18 Claims, 7 Drawing Sheets

(56) References Cited

U.S. PATENT DOCUMENTS

| | | |
|---|---|---|
| 8,649,907 B2 | 2/2014 | Ersavas |
| 8,714,181 B2 | 5/2014 | Shani et al. |
| 9,107,354 B2 | 8/2015 | Martin et al. |
| 9,408,353 B2 | 8/2016 | Neesen et al. |
| 10,241,488 B2 | 3/2019 | Rodriguez et al. |
| 10,482,539 B2 | 11/2019 | Basso |
| 2007/0269310 A1* | 11/2007 | Hill ..................... F04D 27/00 |
| | | 416/120 |
| 2008/0027586 A1 | 1/2008 | Hern et al. |
| 2009/0216345 A1* | 8/2009 | Christfort .......... G05B 19/0428 |
| | | 455/39 |
| 2012/0109387 A1* | 5/2012 | Martin ................ G05B 19/042 |
| | | 700/284 |
| 2016/0219804 A1 | 8/2016 | Romney et al. |
| 2016/0309659 A1 | 10/2016 | Guy et al. |
| 2019/0128269 A1 | 5/2019 | Gottschalk |

FOREIGN PATENT DOCUMENTS

| | | |
|---|---|---|
| FR | 2688650 A1 | 9/1993 |
| IN | 201911048506 A | 12/2019 |
| JP | H07177827 A | 7/1995 |
| WO | 2012123877 A1 | 9/2012 |
| WO | 2013012826 A1 | 1/2013 |
| WO | 2017085557 A1 | 5/2017 |

* cited by examiner

WIND MACHINE CONTROL AND MONITOR SYSTEMS AND METHODS

FIELD OF THE INVENTION

The invention relates generally to control and monitor systems and methods and, more specifically, to a system for controlling and monitoring a wind machine so that a user may remotely start and stop the wind machine.

BACKGROUND OF THE INVENTION

Wind machines are used for frost protection of many permanent crops, such as citruses, apples, stone fruits, and grapes. On low-temperature nights or days, warm air can rise above cooler air, which creates an inversion layer and often results in frost development on orchards, fields, or crops. Wind machines blow warm air in the troposphere down toward the surface of the Earth to mix with the cooler air. This raises the overall ambient temperature surrounding the crops and, thus, prevents frost.

Conventionally, wind machines are operated manually using an ON/OFF switch located in an engine cabinet of the wind machines or automatically using an AUTOSTART industrial controller or engine control unit (ECU). As a result, growers must employ frost surveillance teams to drive around the orchard on cold evenings to ensure the wind machines are running when necessary. A typical orchard or vineyard can possess 20-100 wind machines, depending on acreage and thermal characteristics. With no means to remotely monitor or control the individual wind machines, the personnel of the surveillance teams must drive to each machine and reprogram the wind machine (e.g., the AUTOSTART of the wind machine) to alter the settings. Such a process may take 3-4 hours per orchard. It would, therefore, be desirable to provide improved systems and methods for monitoring and controlling agricultural equipment, such as wind machines.

SUMMARY OF THE INVENTION

In one or more embodiments of the present disclosure, a system is provided for monitoring and controlling a wind machine. The system includes: a transceiver adapted to wirelessly communicate with a remote user device; a processor operatively coupled to the transceiver and configured to receive instructions from and/or transmit data to the user device using the transceiver; and a connector operatively coupled to the processor and a controller of a wind machine. The connector includes a circuit that is configured to receive either a grounded voltage input or a floating voltage input as determined by the processor, and convert the voltage input to a current output such that the output mimics an electrical parameter of the controller. The grounded voltage input creates a first current output that mimics a first electrical parameter, which signals the controller to stop an engine of the wind machine, and the floating voltage input creates a second current output that mimics a second electrical parameter, which signals the controller to start the engine of the wind machine.

In one or more embodiments, the first current output is 0 $\mu A$ and the second current output is between 0 $\mu A$ and 1000 $\mu A$. In other embodiments, the first current output is 0V and the second current output is between 0V and 5V. In one or more embodiments, the grounded voltage input is 0V and the floating voltage input is between 0V and 5V.

In one or more embodiments, the first electrical parameter is a high temperature value above a predetermined temperature threshold, and the second electrical parameter is a low temperature value below the predetermined temperature threshold.

In other embodiments, the system further includes one or more sensors that are communicatively coupled to the processor and configured to collect sensor data. In one or more embodiments, the one or more sensors include one or more fuel sensors, meteorological sensors, or agricultural sensors.

In one or more embodiments, the processor is further configured to receive electrical power from a power source of the wind machine. In other embodiments, the processor is further configured to monitor one or more statuses of the controller or wind machine, and the transceiver is further configured to transmit the one or more statuses to the user device.

In one or more embodiments, the transceiver communicates with the user device using a cellular network. In one or more embodiments, the transceiver communicates with the user device using radio-based communication.

In one or more embodiments, a method is provided for monitoring and controlling a wind machine, the method comprising: providing the system; receiving instructions from the remote user device; creating either a grounded voltage input or a floating voltage input using the processor and circuit; converting the grounded voltage input to a first current output such that the output mimics an electrical parameter of the controller, which stops an engine of the wind machine; and converting the floating voltage input to a second current output such that the output mimics a second electrical parameter of the controller, which starts the engine of the wind machine.

In one or more embodiments, the first current output is 0 $\mu A$ and the second current output is between 0 $\mu A$ and 1000 $\mu A$, or the first current output is 0V and the second current output is between 0V and 5V. In one or more embodiments, the grounded voltage input is 0V, and the floating voltage input is between 0V and 5V.

In one or more embodiments, the first electrical parameter is a high temperature threshold, and the second electrical parameter is a low temperature threshold.

In one or more embodiments, the method includes the process of providing one or more sensors that are communicatively coupled to the processor or transceiver and collecting sensor data. In other embodiments, the one or more sensors include one or more fuel sensors, meteorological sensors, or agricultural sensors.

In one or more embodiments, the method includes the process of receiving electrical power from a power source of the wind machine.

In one or more embodiments, the method further includes the processes of monitoring, by the processor, one or more statuses of the controller; and transmitting, by the transceiver, the one or more statuses to the user device.

In one or more embodiments, the method further includes the process of communicating, by the transceiver, with the user device using a cellular network.

In one or more embodiments, the transceiver communicates with the user device using radio-based communication.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION OF THE INVENTION

The present invention is based on a control and monitor system and corresponding methods for use with agricultural equipment. In particular, the system permits monitoring and controlling of a wind machine such that a user with a remote user device may monitor the status of one or more wind machines and control the engines of the wind machines using the remote user device.

Wind machines are powered by engines, which are often controlled by engine control units (ECUs) or AUTOSTART controllers (herein also referred to as "controller" or, in the plural, "controllers"). A user may manually select an automated setting for the controller, which has predetermined parameters, so that the controller turns the engine on or off depending on which parameter is detected by the controller at a specific moment in time. For frost prevention, the predetermined parameters may be various temperatures that, when detected by the controller, cause the controller to turn the wind machine engine on or off. The system connects to the controller so that personnel can remotely monitor various conditions of or around the wind machine and control the controller remotely, thereby preventing the need to physically attend to every wind machine within an orchard to change settings or parameters.

Figure 1:
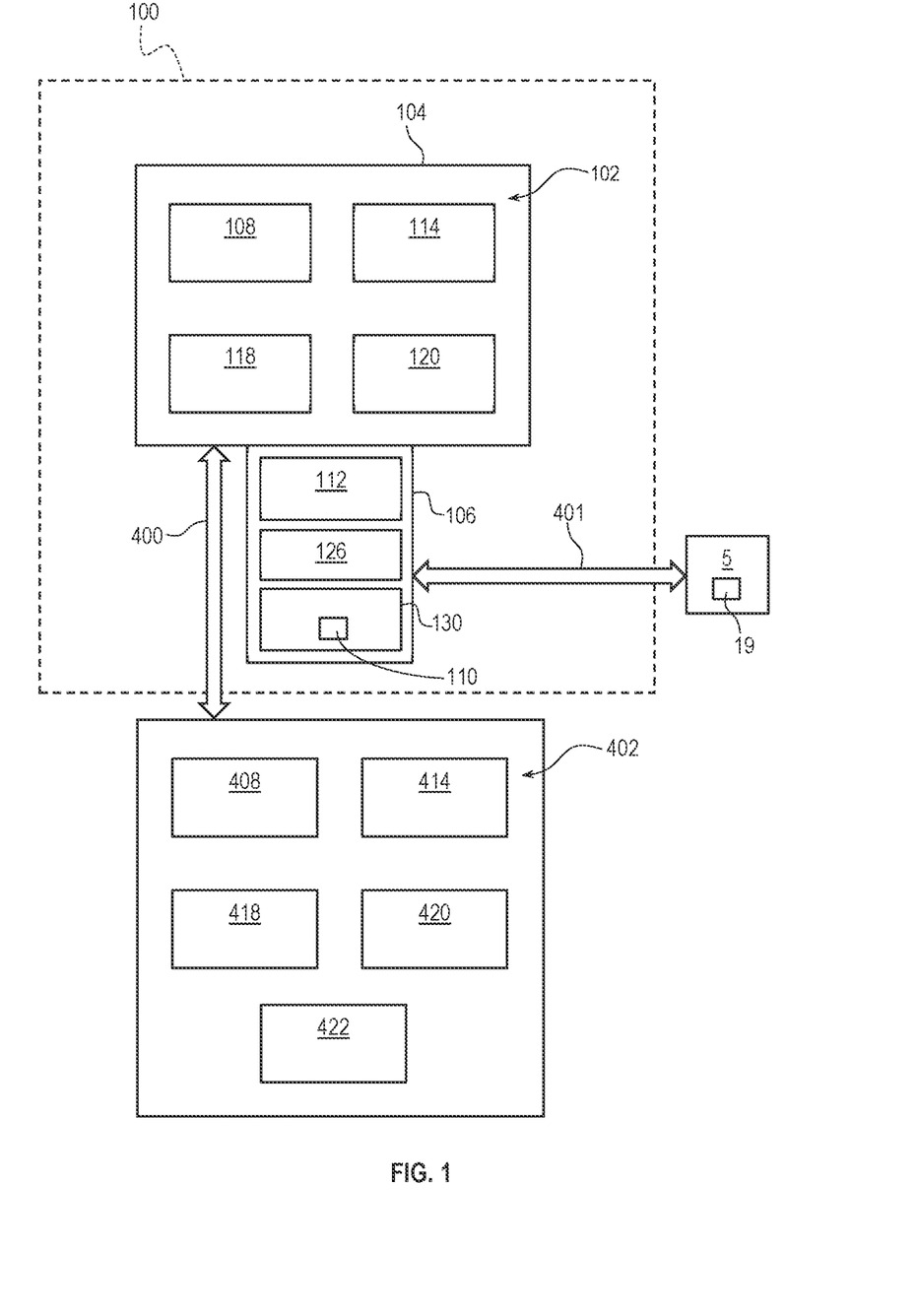
FIG. 1 is a block diagram showing an exemplary wind machine control and monitor system in accordance with one or more embodiments of the present disclosure.

Referring now to the drawings, which are shown for purposes of illustrating embodiments of the present invention only and not for the purposes of limiting the same, FIG. 1 is a block diagram showing an exemplary control and monitor system 100 in accordance with one or more embodiments of the present disclosure. Control and monitor system 100 (herein also referred to as "system") includes a monitoring module 102 configured to communicate with an application-compatible device, such as remote user device 402, and is configured to be communicatively coupled to agricultural equipment, such as a wind machine 5.

Figure 2:
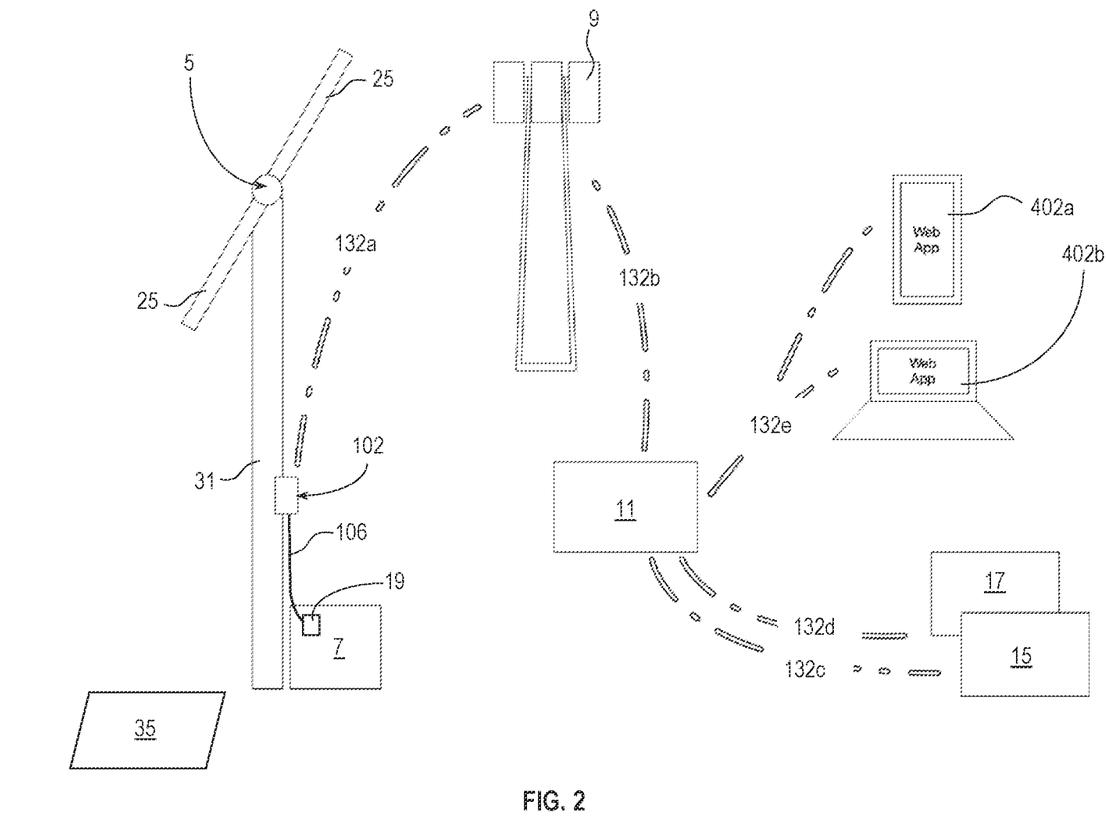
FIG. 2 is a block diagram showing an exemplary use of the system with a wind machine in accordance with one or more embodiments of the present disclosure.
Figure 3:
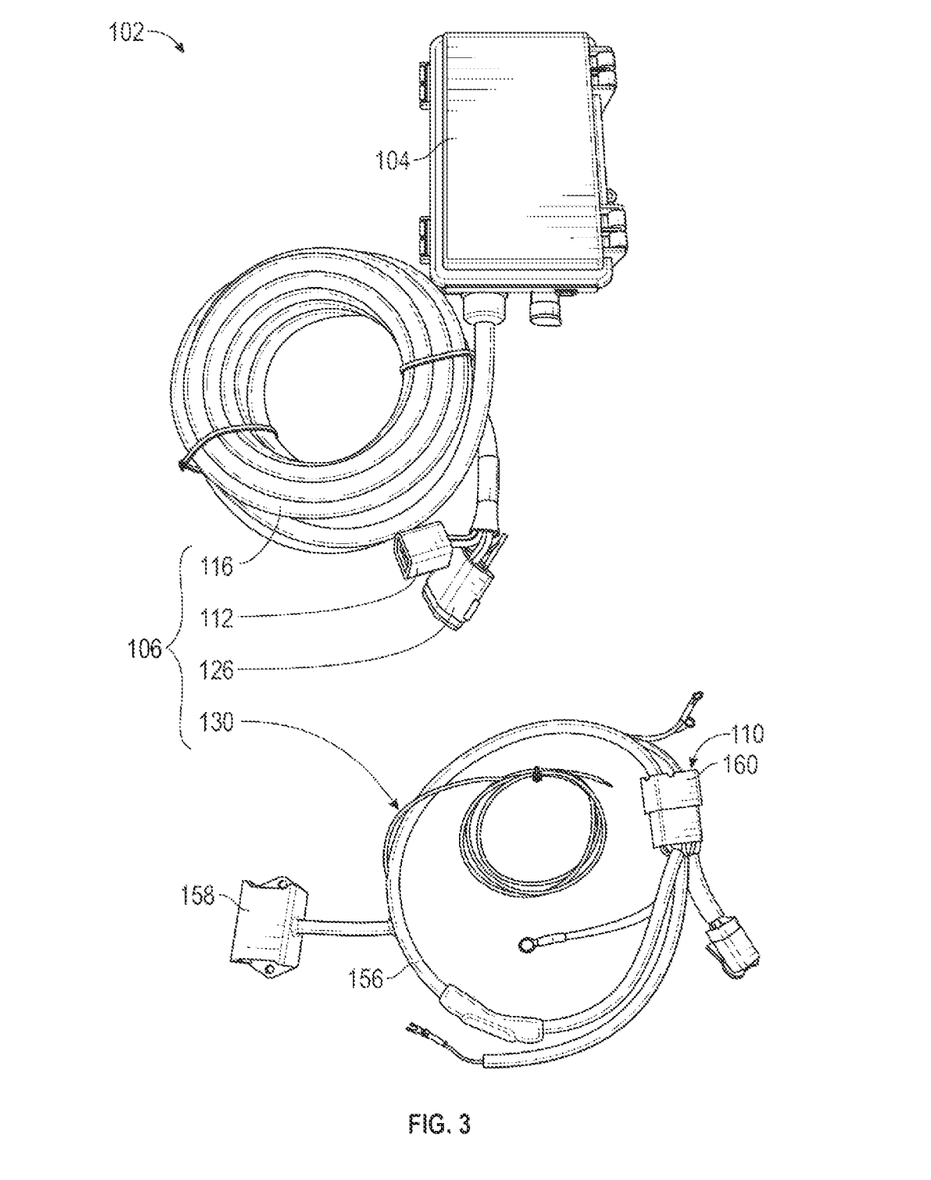
FIG. 3 is a pictorial diagram showing a front view of an exemplary embodiment of the monitoring module of the system in accordance with one or more embodiments of the present disclosure.

In one or more embodiments, monitoring module 102 includes a processor 108, a communication component 114, and a connector 106 (see also FIG. 3). In one or more embodiments, monitoring module 102 may also include a power source 118 or other components 120. Other components may include one or more user interfaces (e.g., displays or buttons), memories, GPSs, sensors, cameras, or any combinations thereof, as discussed further herein. Processor 108, communication component 114, power source 118, and other components 120 may be partially or fully enclosed in a housing 104 (e.g. a waterproof enclosure) (see also FIG. 3). An exemplary connector 106 is shown in FIG. 3, having a cable 116 with at least a communication plug 126 and configured to communicatively couple to agricultural equipment. In one or more embodiments, communication plug 126 may also supply power to monitoring module 102. In one or more embodiments, connector 106 includes a temperature sensor plug 112 that is in electrical communication with a temperature sensor of the corresponding agricultural equipment. For example, temperature sensor plug 112 may connect to a temperature sensor of wind machine 5 (see FIG. 2). In one or more embodiments, plugs 112 and 126 of connector 106 may be automotive grade plugs. In one or more embodiments, connector 106 includes a wiring harness 130. Wiring harness 130 may include a universal plug 158, a compatibility plug 160 with a circuit 110 disposed therein, and a cable 156 (see FIG. 3). Wiring harness 130 is configured to electrically couple plug 126 to the desired agricultural equipment (e.g., engine 7 of wind machine 5). For example, plug 126 may directly connect to wiring harness 130, and wiring harness 130 may directly connect to a connector of engine 7 of wind machine 5, which allows monitoring module 102 to interface with engine 5 and controller 19, as discussed further herein.

In one or more embodiments, monitoring module 102 and user device 402 interface using a wireless communication link 400. For example, monitoring module 102 may communicate with user device 402 directly using communication link 400. In other examples, monitoring module 102 may communicate with user device 402 indirectly by communicating with a cellular tower 9 and a server 11, as discussed further herein (see FIG. 2). In one or more embodiments, user device 402 may include various components similar or supplementary to the components of monitoring module 102. User device 402 may include a processor 408, a communication component 414, a power source 418, a user interface 422, and other components 420. Other components 420 may include, for example, a memory, GPS, one or more cameras, and/or one or more sensors.

User device 402 may be any personal electronic device that supports an application used by system 100 (e.g., a device compatible with a software program implemented by monitoring system 102). For example, user device 402 may be a mobile phone, smartphone, tablet device, laptop computer, desktop computer, or any other devices that may be used to process or present monitoring data or information provided by monitoring module 102. For example, a user may turn on the engine of wind machine 5 using user device 402 by sending instructions to monitoring module 102.

In one or more embodiments, the application may be a desktop application or a web application. For example, the application may be a software program such as, for example, a web browser, an email program, a database software, an information worker software, or any other type of program.

In one or more embodiments, processor 108 may be any appropriate processing device. For example, processor 108 may be a processor, integrated circuit, programmable logic device, microcontroller, or other device that can execute instructions. In one or more embodiments, processor 108 may be configured to communicate with various components or modules of system 100 to perform various methods described herein. For example, processor 108 may establish communication link 400 (e.g., direct or indirect wireless communication) with user device 402 using communication component 114. Once communication link 400 is established between monitoring component 102 and user device 402, processor 108 may, for example, receive or provide data or receive instructions from user device 402 (e.g., processor 408). For example, monitoring device 108 may relay collected data from connected sensors to user device 402. For example, processor 108 may receive temperature data from a connected temperature sensor and send the data to processor 408 of user device 402 via communication link 400 so that the current temperature near wind machine 5 is shown on user interface 422 (e.g., display) for the user to see. In one or more embodiments, processor 108 may be configured to perform any instructions or operations received from user device 402, which can be inputted into user device 402 using user interface 422 (e.g. display or buttons) or any other components (e.g., a memory component).

In one or more embodiments, processor 108 may communicate with any components associated with user device 402 or wind machine 5. Using communication link 400, processor 108 may download or otherwise receive data from user device 402, such as the monitoring system application itself, configuration settings, various sensor data, or other monitoring information. In one or more embodiments, processor 108 may similarly provide data to user device 402. For example, processor 108 may provide configuration settings, sensor data or other monitoring information, or requests for data to user device 402 over established communication links 400 or 401.

In one or more embodiments, communication component 114 is configured to facilitate communication links 400 and 401 between monitoring module 102 and various components of system 100. For example, communication component 114 may be configured to facilitate communication between monitoring module 102 and a networked device (e.g., user device 402) directly or via, for example, the cellular tower 9, as described herein. Communication component 114 may communicate unidirectionally or bidirectionally. In one or more embodiments, communication component may create a wired or wireless communication link. Communication component 114 may communicate with one or more networked devices wirelessly using Wi-Fi (e.g., IEEE 802.11 family of standards), Bluetooth, a cellular tower (e.g., cellular tower 9 shown in FIG. 2), satellite, or any other forms of wireless communication. In one or more embodiments, communication component 114 may also be configured to facilitate wired communication between monitoring module 102 and various other components or devices. For example, communication component 114 may be Ethernet, DSL, optical-fiber, cable, or other types of wired forms of communication. In one or more embodiments, communication component 114 may be a transmitter, receiver, or transceiver. In other embodiments, communication component 114 may include one or more antennas for facilitating wireless communication. Communication component 114 may further include establishing a link with a router, hub, modem, or other communication device.

User interface 422 may include a display (e.g., non-touch screen or touch screen), buttons (e.g., a keyboard or power button), switches, knobs, joysticks, trackballs, indicators (e.g., LEDs), or other type of user interface components configured to accept user input (e.g., input command to turn on wind machine 5).

FIG. 2 is a block diagram showing an exemplary use of system 100 with a wind machine 5 in accordance with one or more embodiments of the disclosure. Wind machine 5 may have one or more blades 25 that are attached to a base 31 and rotated by engine 7, which is turned on manually by personnel or by the ECU. Engine 7 may be an electric motor, mechanical engine (e.g., Chevy 454), or electronically controlled engine (e.g., Ford V-10).

Wind machine 5 provides frost protection for various types of agricultural crops 35. Wind machine 5 may be turned on or off manually (e.g., by personnel) or by implementing a controller 19 (e.g., AUTOSTART controller or an engine control unit (ECU), which uses ambient air temperature readings via a temperature sensor located near wind machine 5 (e.g., 50 feet from base 31) to turn engine 7 of wind machine 5 on and off based on predetermined parameters (e.g., predetermined start and stop temperatures). Though nonlimiting, controller 19 may have three stages: warmup (e.g., 5 minutes at 1,000 RPM); full run (e.g., 2,800 RPM); and cooldown (e.g., 5 minutes at 1,000 RPM). Controller 19 can automatically turn off engine 7 if the detected parameter value falls outside the predetermined range. Orchard personnel can manually adjust the start and stop temperatures on a user panel of controller 19 (shown in FIG. 6) and gather readings such as RPM and battery voltage via the display on controller 19.

In one or more embodiments, monitoring module 102 is mounted on (as shown in FIG. 2) or near base 31 of wind machine 5. Monitoring module 102 has wired communication link 401 with controller 19 using connector 106. In one or more embodiments, wind machine 5 may have an actuator that provides three setting positions: manual, automated, or off. A user may use the actuator to start engine 7 manually, turn off the engine 7 manually, or select an automated mode option. When set to the automated mode, controller 19 may start or stop engine 7 based on detected temperature data provided by a corresponding temperature sensor connected to controller 19, as discussed further herein.

Controller 19 may be located near or on engine 7 so that when an AUTO setting is manually selected, controller 19 turns engine 7 off or on if a first parameter or second parameter is met, respectively. For example, engine 7 may be turned off by controller 19 if the first parameter is met (e.g., temperature value above a predetermined threshold). In another example, engine 7 is turned on by controller 19 if the second parameter is met (e.g., temperature value below a predetermined threshold). When wind machine 5 is on, rotating blades 25 blow warm air of an inversion layer downward toward crops 35 so that the warm air mixes with the lower placed cool air to raise the temperature of the air surrounding crops 35, thus, preventing frost from collecting on crops 35 and causing damage.

In one or more embodiments, connector 106 facilitates the relaying of a digital signal (e.g., 12V or 0V) to wind machine 5 via communication link 401. In one or more embodiments, a Modbus communication may be used to create communication link 401 (shown in FIG. 1) between monitoring module 102 and controller 19. In other embodiments, an analog output may be created by monitoring module 102 to create communication link between monitoring module 102 and controller 19. Monitoring module 102 may be configured to send an analog or digital signal to a temperature sensor port on controller 19 of wind machine 5 in order to trigger controller 19 to turn motor 7 on or off. Therefore, system 100 allows a user to control controller 19 regardless of the make or model of controller 19 and eliminates the need to reprogram or integrate using digital communication with controller 19. For example, monitoring module 102 creates an output voltage or current based on a run signal. The run signal can be used to mimic the temperature sensor used by controller 19 to trigger controller 19 to turn engine 7 on or off, as discussed further herein.

In accordance with an example of an embodiment, monitoring module 102 may transmit and receive data or information over a transmission 132*a* using commercial cellular networks (e.g., cellular tower 9). Cellular tower 9 may send/receive information via transmission 132*b* to/from server 11. Server 11 may send/receive data or information over transmission 132*c* and 132*d* to/from a third-party data software 15 or an email application 17, respectively. Server 11 may also send/receive information directly to/from user devices, such as smartphone 402*a* and laptop 402*b*, through transmission 132*e*. When server 11 is sending the data, the data may be compiled on the corresponding website or application, which displays the data for viewing by a user on a user device 402 (e.g., smartphone 402*a* or laptop 402*b*). Processor 108 may be configured to process sensor data in accordance with corresponding software 15 stored in, for example, a memory of a remote user device, and can be transferred via email application 17. System 100 may also include an output interface, which for example may provide an output electronic signal (e.g., wired or wireless) for remote storage or display on server 11 or user device 402. Therefore, system 100 eliminates the need for personnel to physically go to wind machine 5 to change the parameters, to turn engine 7 on or off, or to check surrounding conditions (e.g., temperature, engine status, or fuel tank status). Instead, a user may view data on user device 402, which is provided by monitoring module 102 or controller 19, to turn engine on or off remotely.

In one or more embodiments, an orchard may have one or more wind machines (e.g., wind machines 5*a-n*) each with a monitoring module 102 mounted thereto (e.g., corresponding monitoring modules 102*a-n*). Each monitoring module 102 may be in wireless communication with remote user device 402 so that user device 402 may either individually control each monitoring module 102 (e.g., turn on/off a selected 5 of 100 wind machines of an orchard) or control all wind machines simultaneously (e.g., turn on/off all wind machines with a single actuation). In one or more embodiments, monitoring modules 102 may be configured to wirelessly communicate with each other.

FIG. 3 is a pictorial diagram showing a front view of an exemplary embodiment of monitoring module 102 in accordance with one or more embodiments of the present disclosure. In one or more embodiments, cable 116 may be bifurcated so that temperature sensor plug 112 and communication plug 126 are separate plugs. However, as understood by one skilled in the art, one plug may be implemented as both the communication plug and power plug. In one or more embodiments, connector 106 may be an integral component of monitoring module 102. In other embodiments, connector 106 may be a separate component and readily detachable from monitoring module 102.

In one or more embodiments, housing 104 is an enclosure. For example, housing 104 may be a waterproof enclosure. In one or more embodiments, housing may be made of plastic, metal, fiberglass, a combination thereof, or any other material suitable for containing electronic components.

In one or more embodiments, power may be supplied through communication plug 126. The power may come directly from the battery of wind machine 5 (e.g., lead acid battery). In one or more embodiments, monitoring module 102 may have power source 118 (FIG. 1) in case the power source of engine 7 (FIG. 6) fails or is disconnected.

In one or more embodiments, circuit 110 is disposed within connector 106. For example, circuit 110 is disposed in wiring harness 130 of connector 106. In one or more embodiments, wiring harness 130 is an adapter that couples plug 126 with wind machine 5. For example, plug 126 may connect to universal plug 158 of wiring harness 130, and compatibility plug 160 of wiring harness 130 may connect to engine 7 of wind machine 5. In one or more embodiments, plug 160 may be any type of plug that is compatible with the specific model of agricultural equipment that a user desires to connect system 100 to. In one or more embodiments, circuit 110 is at least partially disposed within plug 160 of wiring harness 130 so that monitoring module 102 and the agricultural equipment may interface using wired communication link 401 when coupled. Thus, when wiring harness 130 is coupled to controller 19, circuit 110 can provide an input current to controller 19.

Figure 4:
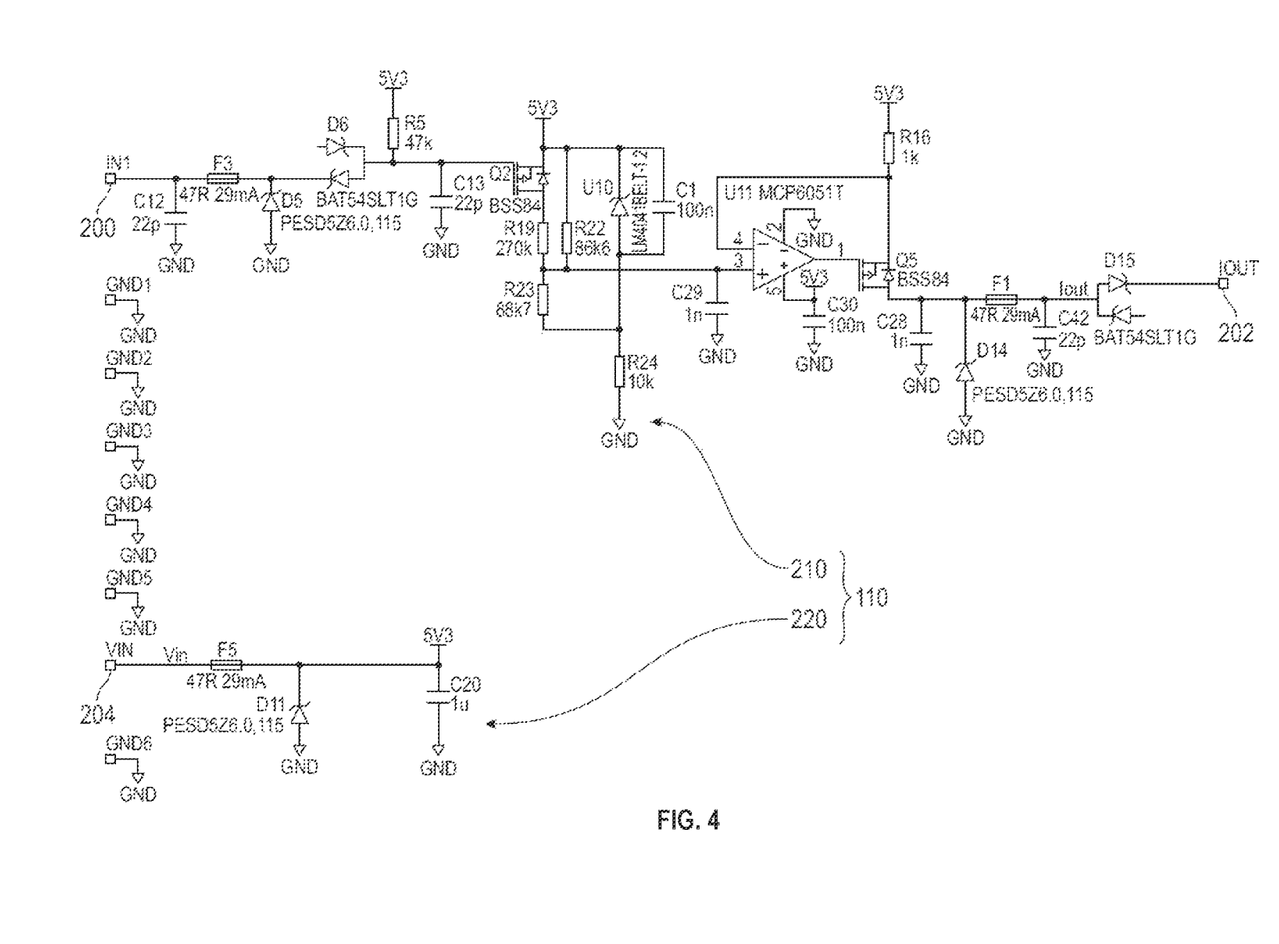
FIG. 4 is a block diagram showing an exemplary circuit of the system in accordance with one or more embodiments of the present disclosure.

FIG. 4 is a block diagram showing circuit 110 of the system 100 in accordance with one or more embodiments of the present disclosure. In one or more embodiments, circuit 110 may be a printed circuit board assembly (PCBa). Circuit 110 is attached to connector 106 (e.g., in wiring harness 130 of connector 106 (FIG. 1). In one or more embodiments, processor 108 of monitoring module 102 (FIG. 1) is configured to trigger circuit 110 to produce a high or low output current that mimics the signals of the temperature sensor of controller 19. More specifically, circuit 110 uses the same power signal as a temperature sensor of wind machine 5 to generate an equivalent current signal that mimics a signal from the sensor. Therefore, the signal produced by monitoring module 102 is electrically identical to or at least not distinguishable from the analog signal of the temperature sensor of controller 19.

In one or more embodiments, circuit 110 includes at least two distinctive processing paths (210, 220). A first path 210 processes an input voltage from processor 108 and converts the input voltage to an output current that mimics the analog signal of the temperature sensor of controller 19. A second path 220 processes voltage received from controller 19.

For path 210 (i.e. output selector circuit), an input 200 receives a voltage from processor 108. For example, processor 108 may produce a grounded or floating voltage to represent a logic state. For example, processor 108 may produce a grounded voltage input after receiving instructions from user device 402 to turn off wind machine 5. Grounded voltage may be, for example, 0V. In another example, processor 108 may produce a floating voltage input after receiving instructions from user device 402 to turn on wind machine 5. A floating voltage may, for example, have a range of $0<x<5V$ (e.g., 4V), as discussed further herein.

The input will pass fuse F3 for overcurrent protection to barrier diode D6. Diode D6 leads to various components such as resistors (e.g., R19, R23, R24, and R16), integrated circuits (e.g., U10), capacitors (e.g., C1, C 28, C29, C30, and C42), fuses (e.g., F1), and diodes (D14 and D15), and passive components (e.g., Q2, U11, and Q5).

The active components include transistor Q2, integrated circuit U11, and transistor Q5. In one or more embodiments, transistors Q2 and Q5 are P-channel enhancement mode field-effect transistors. For example, transistors Q2 and Q5 may be insulated-gate field-effect transistors such as a metal-oxide-semiconductor field-effect transistor (MOSFET). In one or more embodiments, integrate circuit U11 is a general purpose amplifier. The combination of Q2, U11, and Q5 converts the input voltage to an output current.

In one or more embodiments, an output current is produced at output 202 that is received by controller 19. The current output may be, for example, between 0 μA and 1000 μA. For example, the input voltage may be a grounded voltage input, so that the output current range mimics a first parameter (e.g., high temperature value, such as 90° F.) that is above a set temperature threshold (e.g., 30° F.) and turns off wind machine 5. In other embodiments, the current output may be between 0V and 5V. In one or more embodiments, the grounded voltage input may be 0V to produce an output current of 0 μA (i.e. x=0 μA) or 0V to create an error state that results in wind machine 5 being shut down by controller 19. In another example, the input voltage may be a floating voltage input so that the output current range mimics a second parameter (e.g., low temperature value, such as 20° F.) that is below the set temperature threshold and turns on wind machine 5. For example, the floating voltage input may have a range between 0-5V (e.g., 4V) so that the corresponding current output range is between 0-1000 μA (e.g., 605 μA) to mimic the second parameter. Thus, in an exemplary embodiment, the floating voltage input may be a value greater than 0V and less than 5V (i.e. 0V<x<5V) that is chosen by a user to be associated with a desired low temperature value so that the corresponding current output may be greater than 0 μA and less than 1000 μA (i.e. 0 μA<x<1000 μA), a value lower than the temperature threshold that turns on wind machine 5.

For path 220 (i.e. amplifier circuit) voltage input 204 receives power from controller 19. Amplifier circuit 220 receives voltage output from temperature sensor voltage supply 21 (see FIG. 5) of controller 19 so that circuit 110 can use the same power signal as controller 19 of wind machine 5 to generate an equivalent current signal. In one or more embodiments, path 220 protects controller 19 as it cannot receive more voltage than it inputs. In one or more embodiments, a voltage regulator may be implemented (e.g., 78L06) and the output from the voltage regulator may be via an internal resistor (e.g., 680R). In one or more embodiments, a nominal output may be 0V and a maximum output may be 5V.

Figure 5:
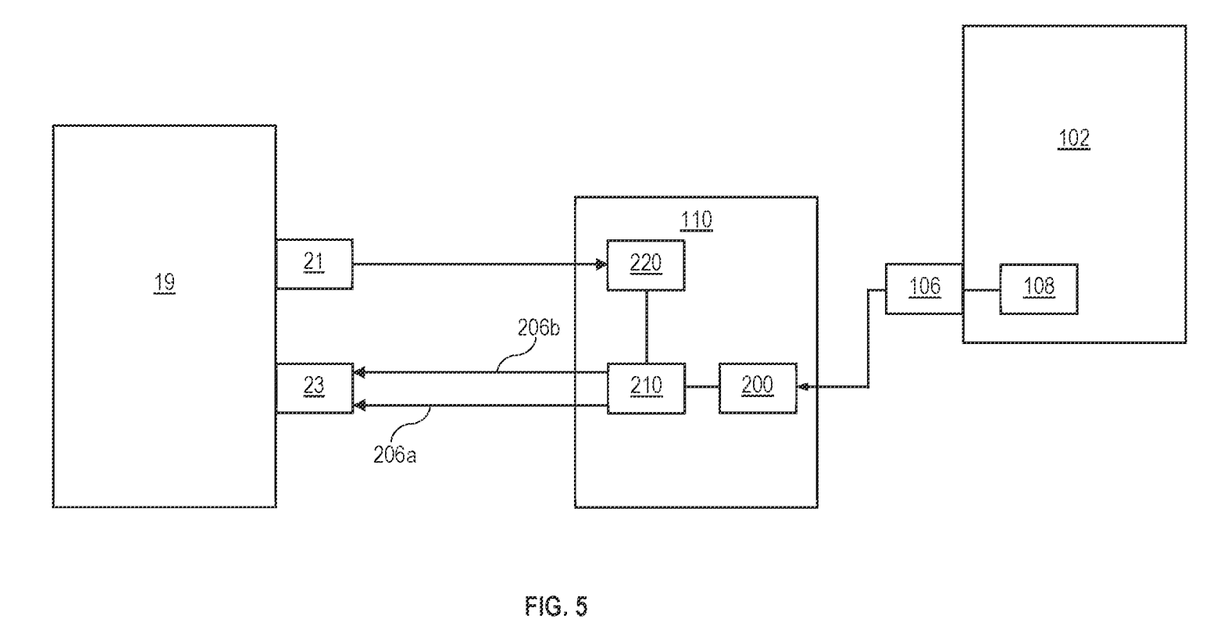
FIG. 5 is a block diagram showing an exemplary use of the monitoring module of the system in accordance with one or more embodiments of the present disclosure.

FIG. 5 is a block diagram showing an exemplary use of monitoring module 102 in accordance with one or more embodiments of the present disclosure. In one or more embodiments, processor 108 determines when to set the digital control output to either high or low voltage. Connector 106 creates wired communication link 401 (see FIG. 1) between monitoring system 102 and controller 19 so that the high or low voltage output can be communicated to circuit 100 and to controller 19. In one or more embodiments, amplifier circuit 220 of circuit 110 may be connected to a temperature sensor voltage supply 21 of controller 19 to receive power in order to generate an equivalent current signal as the temperature sensor. The signal is mimicked by output selector circuit 210 and communicated to temperature sensor signal input 23 of controller 19 so that controller 19 receives a mimicked first parameter (e.g., high temperature signal 206a) or a mimicked second parameter (e.g., low temperature signal 206b) and stops or starts wind machine 5, respectively.

In accordance with an exemplary embodiment, temperature threshold (e.g., 30° F.) may be predetermined by a user so that when a low temperature (e.g., a temperature value less than 30° F.) is detected by temperature sensor 37 of controller 19, a corresponding unique signal is transmitted to controller 19. As a result, controller 19 turns on engine 7 of wind machine 5. The unique signal of the second parameter can be mimicked by circuit 110, however, so that a user can start wind machine 5 at any time remotely. Using remote device 402, a user may instruct processor 108 to produce a voltage output to circuit 110 that mimics the unique signal of temperature sensor 37 so that controller 19 detects that the second parameter has been met and turns on engine 7 in response. Similarly, the unique signal of the first parameter (e.g., a temperature value of 30° F. or more) can be mimicked to instruct controller 19 to stop engine 7 of wind machine 5.

In one or more embodiments, user device 402 may be configured to receive or indicate local readings and provide remote operation of monitoring module 102. Bidirectional communication between monitoring module 102 and user device 402 may facilitate a user's desired changing of parameters or settings of controller 19 or monitoring module 102.

Figure 6:
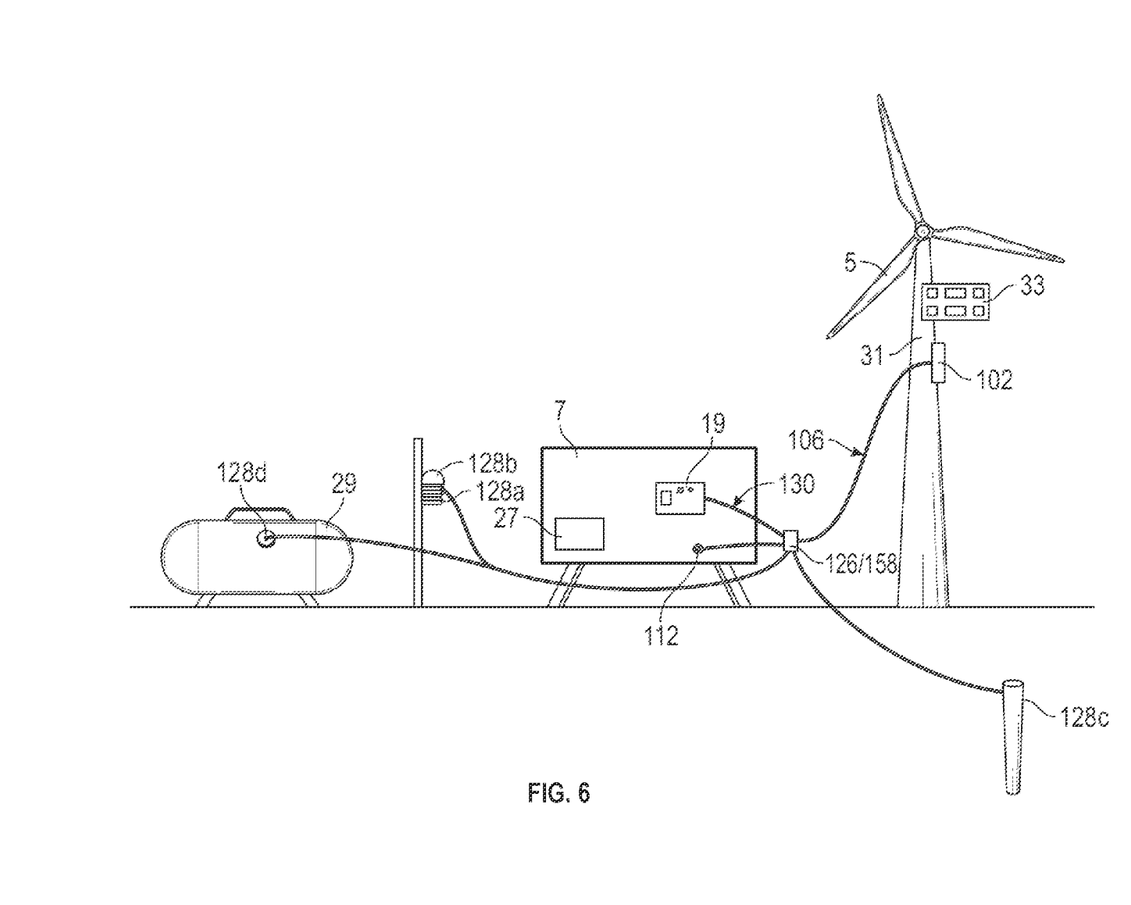
FIG. 6 is a pictorial diagram showing an exemplary use of the system in accordance with one or more embodiments of the present disclosure.

FIG. 6 is a pictorial diagram showing an exemplary use of system 100 in accordance with one or more embodiments of the present disclosure. In one or more embodiments, monitoring module 102 may include other components 120. Other components 120, may include a user interface (e.g., display, indicators, buttons), fuel sensors (e.g., a fuel tank sensor 128d), meteorological sensors (e.g., a temperature sensor 128a and a humidity sensor 128b), agricultural sensors (e.g., a soil moisture sensor 128c), an engine status sensor (not shown), a motion sensor (not shown), an infrared camera (not shown), a visible spectrum camera (not shown), a memory, a GPS, or any combinations thereof. The data from the other components may be transmitted to user device 402 via communication link 400. The user may receive an alert on user device 402 if, for example, certain sensor data is received (e.g., fuel tank sensor provides data showing fuel tank is low and requires service).

In one or more embodiments, power source 118 (shown in FIG. 1) may be a battery, a power adapter, a charging circuit, a power interface, or any other type of power supply. In one or more embodiments, monitoring module 102 receives power using connector 106. More specifically, communication plug 126 of connector 106 electrically connects to a power source of controller 19 so that monitoring module 102 does not have to provide an independent power source or only provides power source 118 as a backup power supply.

In one or more embodiments, monitoring module 102 draws power from the engine of wind machine 5. For example, monitoring module 102 may draw power from battery 27 (e.g., a 12V lead acid battery) located in a cabinet of engine 7 of wind machine 5. The 12V lead acid battery may be rechargeable by a solar panel 33 mounted to base 31 of wind machine 5. In one or more embodiments, monitoring module 102 may include battery 118 (e.g., a small lithium ion), which provides temporary backup power in case battery 27 of engine 7 fails or is disconnected. In one or more embodiments, monitoring system 102 may directly connect to battery 27 using connector 106 to measure voltage.

In one or more embodiments, connector 106 may provide connections to engine 7 to measure RPM (e.g., get a signal from the tach output of the ignition coil and relay RPM readings to system 100), battery voltage, error codes, the current status of controller 19, current status of engine 7, output analog run signal, or any combinations thereof. In one or more embodiments, connector 106 may directly connect to mechanical or electrical motors. For example, connector 106 may provide connections to the battery of engine 5, the RPM sensor of engine 7, and a hand-off-auto switch of wind machine 5 (e.g., hand-off-auto switch of a gauge panel on wind machine 5). In one or more embodiments, connector 106 may include a plurality of plugs. For example, wiring harness 130 may have additional plugs so that additional sensors or data collecting devices (e.g., one or more temperature sensors, humidity sensors, fuel sensors, soil moisture sensors, engine status sensors, motion sensors, infrared cameras, visible spectrum cameras, or GPSs) may be added to system 100. In one or more embodiments, monitoring module 102 can transmit information and data regarding agricultural equipment and sensors to user device 402 for viewing on a display by the user.

In one or more embodiments, system 100 includes a cellular modem for internet connectivity, cellular antenna, battery for backup power, and circuitry to filter, measure, and provide electronic signals and outputs. In one or more embodiments, the electronics of system 100 may be contained in housing 104, such as a waterproof enclosure (e.g., an IP67 weatherproof enclosure).

Figure 7:
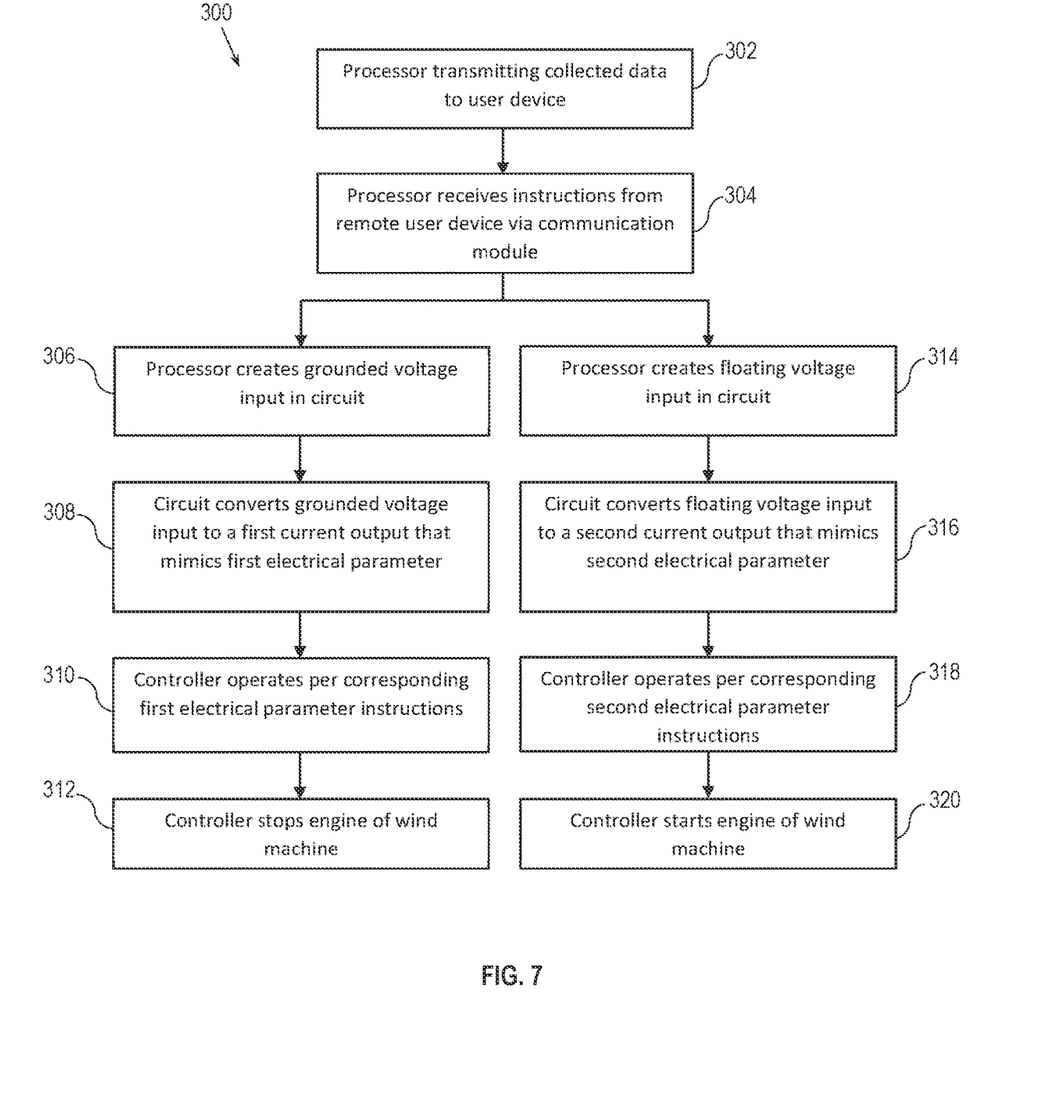
FIG. 7 is a flow chart showing an exemplary process of the system in accordance with one or more embodiments of the present disclosure.

FIG. 7 is a flow chart showing an exemplary process 300 of system 100 in accordance with one or more embodiments of the present disclosure.

In block 302, a monitoring and controlling process includes processor108 transmitting data collected from one or more components of system 100 (e.g., sensors of other components 120) to user device 402. For example, processor 108 may use communication module 114 to transmit temperature data (e.g., information collected from a temperature sensor) to user device 402 so that a user may see the ambient temperature surrounding the crops. A user may then determine if engine 7 should be turned on or off based off of the provided temperature data.

In block 304, a monitoring and controlling process includes processor 108 receiving instructions from user device 402 via communication component 114 (e.g., transceiver). For example, processor 408 of user device 402 may send instructions to processor 108 to turn off engine 7 of wind machine 5. In another example, processor 408 of user device 402 may send instructions to processor 108 to turn on engine 7 of wind machine 5.

In blocks 306 and 314, a monitoring and controlling process includes processor 108 creating a voltage based on the received instructions from user device 402. As shown in block 306, processor 108 may create a grounded voltage input for input 200 of circuit 110 (shown in FIG. 5) after receiving instructions from user device 402 to turn off engine 7. For example, the input may be 0V. As shown in block 314, processor 108 may create a floating voltage input for input 200 of circuit 110 (shown in FIG. 5) after receiving instructions from user device 402 to turn on engine 7. For example, the input may be greater than 0V.

In blocks 308 and 316, a monitoring and controlling process includes circuit 110 converting the input voltage to mimic a desired parameter. As shown in block 308, output selector circuit 202 of circuit 110 may convert the grounded voltage input of input 200 to a first current output that mimics a first electrical parameter of controller 19. For example, output selector circuit 202 may convert the grounded voltage to an output current of 0 µA to mimic a high-value temperature (e.g., 90° F.) or to create an error state. As shown in block 316, output selector circuit 202 of circuit 110 may convert the floating voltage input of input 200 to a first current output that mimics a second electrical parameter of controller 19. For example, output selector circuit 202 may convert the floating voltage to an output current of, for example, 605 µA to mimic a low-value temperature (e.g., 20° F.).

In blocks 310 and 318, a monitoring and controlling process includes controller 19 operating per the detected parameter. In block 310, controller 308 may operate per first electrical parameter instructions set for controller 19. For example, temperature sensor signal input 23 of controller 19 (shown in FIG. 5) may receive a low input from output selector circuit 202 so that a high temperature is detected by controller 19 or an error state is created. The low input may mimic the high temperature parameter. In block 318, controller 308 may operate per corresponding second electrical parameter instructions. For example, temperature sensor signal input 23 of controller 19 (shown in FIG. 5) may receive a high input from output selector circuit 202 so that a low temperature is detected by controller 19. The high input may mimic the low temperature parameter.

In blocks 312 and 320, a monitoring and controlling process includes controller 19 turning engine 7 on or off based on the detected parameter. In block 312, controller 19 stops engine 7 of wind machine 5 since the first electrical parameter (e.g., high temperature or error state) is detected. In block 320, controllers 19 turns on engine 7 of wind machine 5 since the second parameter (e.g., low temperature) is detected.

The disclosure is not intended to limit the present invention to the precise forms or particular fields of use disclosed. It is contemplated that various alternate embodiments and/or modifications to the present invention, whether explicitly described or implied herein, are possible in light of the disclosure. For example, it is contemplated that the various embodiments set forth herein may be combined together and/or separated into additional embodiments where appropriate. Where applicable, the ordering of various steps described herein can be changed, combined into composite steps, and/or separated into sub-steps to provide features described herein.

Although the invention has been described with reference to the above example, it will be understood that modifications and variations are encompassed within the spirit and scope of the invention. Accordingly, the invention is limited only by the following claims.

What is claimed is:

1. A system for monitoring and controlling a wind machine, the system comprising:
    a transceiver adapted to wirelessly communicate with a remote user device;
    a processor operatively coupled to the transceiver and configured to receive instructions from and/or transmit data to the remote user device using the transceiver; and
    a connector operatively coupled to the processor and a controller of a wind machine, the connector comprising:
        a circuit configured to:
            receive a voltage input being either a grounded voltage input or a floating voltage input as determined by the processor; and
            convert the voltage input to a current output such that the current output mimics an electrical parameter of the controller;

wherein the grounded voltage input creates a first current output that mimics a first electrical parameter, which signals the controller to stop an engine of the wind machine; and wherein the floating voltage input creates a second current output that mimics a second electrical parameter, which signals the controller to start the engine of the wind machine.

2. The system of claim 1, wherein the first current output is 0 µA and the second current output is between 0 µA and 1000 µA, or the first current output is 0V and the second current output is between 0V and 5V.

3. The system of claim 1, wherein the grounded voltage input is 0V, and the floating voltage input is between 0V and 5V.

4. The system of claim 1, wherein the first electrical parameter is representative of a high temperature value above a predetermined temperature threshold, and the second electrical parameter is representative of a low temperature value below the predetermined temperature threshold.

5. The system of claim 1, further comprising one or more sensors that are communicatively coupled to the processor and configured to collect sensor data, and wherein the one or more sensors include one or more fuel sensors, meteorological sensors, or agricultural sensors.

6. The system of claim 1, wherein the processor is further configured to receive electrical power from a power source of the wind machine.

7. The system of claim 1, wherein the processor is further configured to monitor one or more statuses of the controller or of the wind machine, and the transceiver is further configured to transmit the one or more statuses to the remote user device.

8. The system of claim 1, wherein the transceiver communicates with the remote user device using a cellular network or radio-based communication.

9. The system of claim 1, wherein the voltage input, as determined by the processor, is based on instructions received via the transceiver from the remote user device.

10. The system of claim 1, wherein the current output is sent to a temperature sensor port on the controller of the wind machine to signal the controller to stop or start the engine of the wind machine.

11. The system of claim 5, wherein the transceiver is configured to transmit the sensor data collected to the remote user device for remote monitoring.

12. The system of claim 11, wherein the processor receives instructions from the remote user device in response to any one of the sensor data or the alert via the transceiver.

13. The system of claim 12, wherein the sensor data is temperature data, and wherein the instructions comprise instructions to turn on or off the engine of the wind machine.

14. The system of claim 5, wherein the processor is configured to monitor the sensor data to generate an alert when certain sensor data is received, and wherein the transceiver is configured to transmit the alert to the remote user device.

15. The system of claim 14, wherein the processor receives instructions from the remote user device in response to any one of the sensor data or the alert via the transceiver.

16. The system of claim 15, wherein the sensor data is temperature data, and wherein the instructions comprise instructions to turn on or off the engine of the wind machine.

17. The system of claim 1, wherein the transceiver, the processor and the connector are integrated as a monitoring and controlling device.

18. The system of claim 17, wherein the monitoring and controlling device is a controller-agnostic device connectable via the connector to different types or makes of controllers of wind machines.

* * * * *